3,083,134
MANUFACTURE OF ARTIFICIAL LEATHER-LIKE MATERIAL
John Holden Fairclough and Harold Jeffrey Atkins, Culcheth, near Warrington, England, assignors to Tootal Broadhurst Lee Company Limited, Manchester, England
Filed Dec. 5, 1960, Ser. No. 73,489
Claims priority, application Great Britain Dec. 9, 1959
12 Claims. (Cl. 156—247)

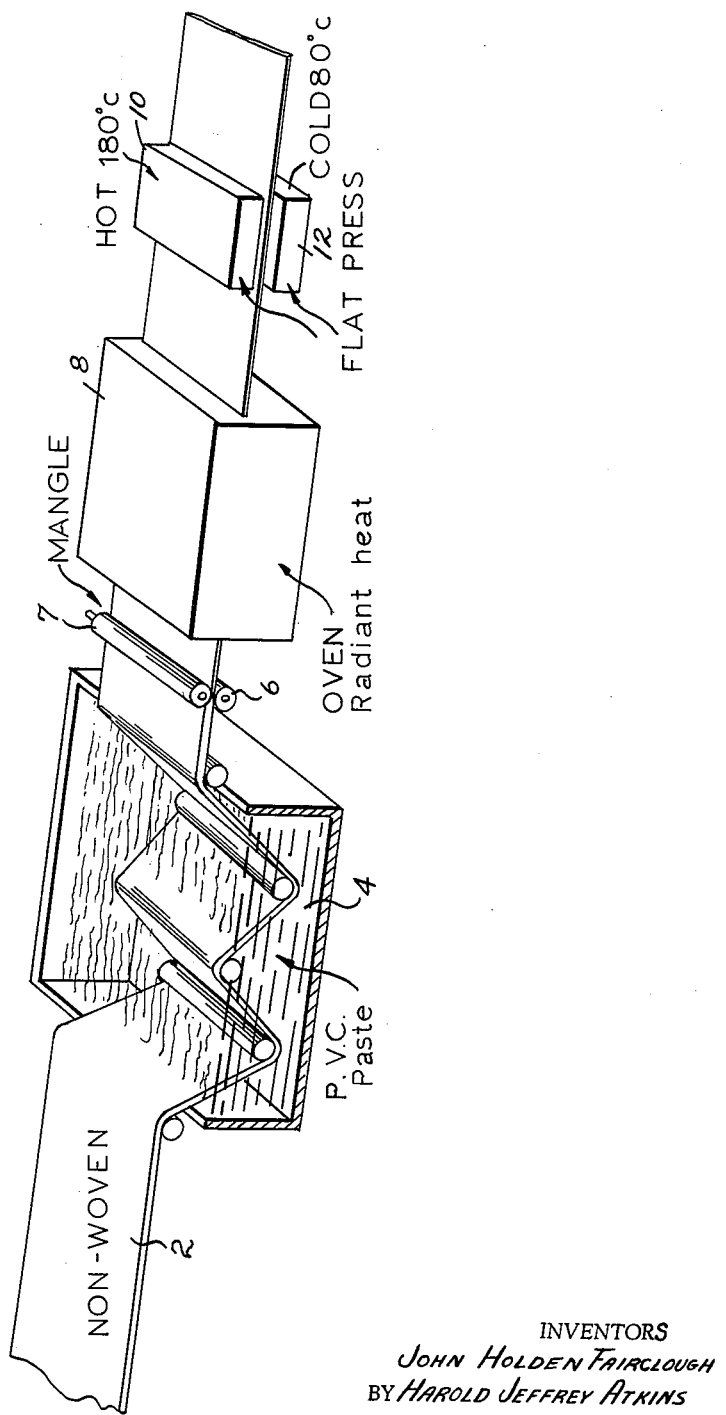

The present invention relates to the manufacture of artificial leather-like material having a "grain" or smooth side and a "flesh" or fibrous side.

Various methods of manufacturing artificial materials having some of the properties of natural leather and made from artificial resin and textile materials are well known. For example it is known to manufacture coated materials by applying resin to textile fabric so as to form a film or coating of resin on the fabric and it is known to manufacture materials having certain leather-like properties by treating non-woven fabrics with resins. Two desirable properties in artificial leather are adequate porosity to air and water vapour and freedom from "cracking." By "cracking" we mean the formation of cracks instead of a smooth fold when the material is folded, in the way characteristic of paper. It is especially difficult to manufacture artificial materials which combine these two properties and which are suitable as a substitute for heavy leather such as is used for the uppers of shoes, upholstery and luggage.

There has previously been proposed a method of manufacturing a leather-like material from a web of fibres bonded together with a polymeric thermoplastic fibre bonding agent, the quantity of bonding agent being such that the web so formed contains not more than 75%, calculated on the total weight of the dry bonded web. It is stated in such proposal that the web may be impregnated with a solution or dispersion of the bonding agent. Such materials are comparatively lightweight materials and we have now found that by the use of a non-aqueous dispersion of a thermoplastic polymeric fibre-bonding agent containing a plasticiser for the bonding agent heavier materials such as are suitable as a substitute for heavy leather can be made.

According to the present invention there is provided a method of manufacturing an artificial leather-like material having a "grain" side and a "flesh" side and which has substantially no tendency to crack on the "grain" side and which is porous to air and water vapour which comprises treating a non-woven web of fibres of which at least 10% are synthetic polymeric fibres having a high degree of elasticity and recovery from creasing with a non-aqueous dispersion of a thermoplastic polymeric fibre-bonding agent containing a plasticiser for the bonding agent, the finished leather-like material containing not more than 25% and not less than 10% by weight of the fibres of the non-woven web calculated on the weight of the finished product, heating to gel at least partly the dispersion, and either applying pressure to the web, one side only of which is hot enough to cause the bonding agent to soften on that side but not hot enough to damage the fibres; or alternatively passing the web through a sueding calender having two or more bowls, of which one has an abrasive surface and is driven at a higher speed than that of the web.

It is if the finished product is to be used as a substitute for suede leather that the bonded web is passed through a sueding calender.

Alternatively if it is to be used as the more usual kind of artificial leather then the temperature differential between the two sides of the web may be achieved in any one of several ways. Thus, for example, the heating to gel the dispersion may suffice in which case the web is heated to the required temperature and then one side of the web is cooled and the web then pressed between cold rollers. Alternatively it can be heated on one side in such a way as to soften the bonding agent only on the heated side and pressed. Thus the bonded web may be passed under pressure between a pair of rollers, which are either in contact with each other or set apart by a distance which is not greater than the thickness of the fabric, one of these rollers is heated and is preferably made of metal and the other of which is unheated. The unheated roller may conveniently be of a softer material than metal, for example, compressed cotton or rubber. Preferably however the bonded web is hot pressed between plates, one of which is unheated and the other of which is heated to a temperature sufficient to cause the resin to soften but insufficient to damage the fibre. Alternatively to using a hot roller or hot plate the bonded web may be first heated on one side only, either by contact with a hot plate or roller or by infra-red heating means in such a way as to soften the bonding agent on that side only of the web and then whilst the bonding agent is still soft, the web is pressed between the cool-bowls of a calender. In this case also the bowls may either be in contact with each other or set apart by a distance which is no greater than the thickness of the fabric. According to this method one of the bowls may be of metal and the other of a softer material. In this case after passing between the bowls the web is kept in contact with the metal bowl until the bonding agent has set. The web may be cooled after the heating to gel at least partly the dispersion and then reheated on one side only followed by pressing between the cool-bowls of a calender. In another embodiment the web is allowed to cool after the heating to gel at least partly the dispersion, then reheated on one side only, this reheated side then being brought into contact with a suitable paper and the two layers fused together by calendering through a two-roller machine. The roller coming into contact with the paper should be at approximately 180° C. to 200° C. in the case where the bonding agent is polyvinyl chloride. After calendering the paper is stripped away from the web. In this context a paper is "suitable" if it has a smooth face, is sufficiently strong to retain its form when the web is fused on to it and if it can be stripped off without leaving any part of the paper behind on the web.

The conditions of heat, pressure and time must be such that the desired degree of fusion and consolidation is obtained but care must be taken to ensure that this does not result in the product being insufficiently permeable to air and water vapour. The pressure is inversely related to the time under pressure. When using polyvinyl chloride as the bonding agent, the temperature of heating immediately before or during pressing should be in the region of 180° C. When heating and pressing are carried out with a temperature of 180° C., then, for example, a time of heating for 10 seconds with a pressure of 600 lbs. per square inch, may be used, or alternatively 60 seconds and 100 lbs. per square inch, or 300 seconds with 20 lbs. per square inch.

As stated above it is important that the extent of heating and pressing is such that the permeability of the product to air and water vapour is not too seriously decreased. We have found that if a thin layer of a finely divided filler material, preferably of a fibrous nature is deposited on that side of the nonwoven material which is to be heated and which ultimately forms the grain side of the product, then the extent of heating and pressing necessary to obtain the best effect is reduced and the danger of unduly reducing permeability is also reduced.

Examples of filler material are powdered fibrous material such as leather dust or powdered nylon or cotton fibres. The filler material may be dispersed in the non-aqueous dispersion of the thermoplastic fibre bonding agent and when this dispersion is applied, for example to one side of the web by roller coating, spraying or knife spreading, the filler material remains on the surface of the web as a fine layer while the bonding agent itself penetrates into the web.

Preferably the finished product has a weight of between 10 and 30 ozs. per square yard.

We have found that if the finished product contains less than 75% by weight of bonding agent as defined above then there is a tendency for the product to "crack" on bending unless it has been compressed to such an extent that it is unsuitable as a substitute for heavy leather. If, however, it contains more than 90%, then the product before heating and pressing is less porous than if it contained less than 90% and after heating and pressing it is insufficiently permeable to air and water vapour.

The non-woven web may be one in which the fibres are first bonded together with sufficient bonding agent to ensure that the web has sufficient strength for its subsequent treatment with the non-aqueous dispersion of bonding agent and plasticiser. The first-mentioned bonding agent may, if desired, be the same as the second-mentioned bonding agent.

The synthetic polymeric fibres may be polyester, for example, those sold under the registered trademark. Terylene, nylon fibres, or others which have similar high degree of elasticity and recovery from compression and are substantially unaffected by the non-aqueous dispersion of the bonding agent and the hot pressing. The remaining 90% of fibres may be fibres which are less resilient than the polymeric fibres such as, for example, cotton or viscose rayon. Preferably the web is composed of fibres having a substantially random orientation to ensure that the finished product has similar strength and extensibility in all directions.

The theremoplastic polymeric bonding agent may be for example cellulose acetate, ethyl cellulose, polyvinyl butyral, but is preferably a vinyl polymer, for example polyvinyl chloride or a co-polymer of vinyl chloride with vinyl acetate. The bonding agent may conveniently be applied to the web as a dispersion, the liquid phase of which consists either entirely of plasticiser or a non-aqueous volatile liquid together with a plasticiser. Suitable plasticisers, when the polymer is polyvinyl chloride or a co-polymer of vinyl chloride with vinyl acetate include phthalates such as dioctyl or dibutoxyethyl phthalates, dicapryl adipate, dioctyl sebacate, trioctyl phosphate and linear polyester plasticisers. In carrying out the process it is, of course, necessary to choose as plasticiser a substance which produces a plasticising effect on the particular bonding agent used and which is also compatible with the bonding agent in other respects. Preferably the plasticiser is one which will dissolve the bonding agent on heating. The dispersion of the bonding agent may contain diluents, fillers and other additions.

The dispersions may be applied to the web in standard ways, for example, by dipping or spreading followed by mangling, after which it is necessary to heat the impregnated web in order to gel at least partly the dispersion. In the case of polyvinyl chloride dispersions the impregnated web must be heated to about 180° C. for 2 to 3 minutes to gel completely the polymer. If the full strength and chemical resistance of the polymer are not required in the final product then the polymer need only be partially gelled in which case a lower temperature or shorter time of heating can be used. By applying dispersions of this type in this way there is very little, if any, migration of the bonding agent during the processing so that at this stage the product has a substantially homogeneous structure; that is to say the ratio of fibre to binder is substantially the same throughout the product.

The fibre/binder ratio of the product may be determined by the void volume of the bonded web prior to pressing and this should preferably be greater than 20% and preferably greater than 30%. The final product after pressing should have a void volume preferably greater than 10% but if it is greater than 35% then the product will have a tendency to "crack."

Simultaneously with hot pressing or separately the smooth grain side of the material may be embossed with a design to give it the surface and appearance of natural leather.

After hot pressing the material may be passed through a sueding calender. After hot pressing and either embossing or sueding the leather-like material may be sprayed with the usual leather finishing agents including pigment which is used on leather together with a suitable binder and subsequently dried.

The present process provides a method of manufacturing an artificial leather-like material having a high binder content. The finished product combines the properties of permeability to gas, freedom from "cracking" and high strength including high tensile strength, tear and flex resistance. Further, those materials made using polyvinyl chloride as bonding agent may be joined together by high frequency welding.

The single figure of the drawing is a schematic illustration of one method of carrying out the invention.

As shown in the drawing, there is provided a non-woven web 2 of fibers of which at least 10% are synthetic polymeric fibers. This web is then passed through a bath 4 of thermoplastic polymeric fiber-bonding agent, e.g., polyvinyl chloride (PVC), containing a plasticizer for the bonding agent. The web is then squeezed between the bowls 6 and 7 of a mangle and next passed through a radiant heat oven 8 to gel the thermoplastic bonding agent. Then the web is compressed in a flat bed press having a hot pressure plate 10 and a cold pressure plate 12. The hot side of the press is at a temperature at which the bonding agent softens but at which the fibers of the web are not damaged, and the cold side of the press is below the temperature at which the binder softens.

The invention will be more clearly understood by reference to the following examples which are purely illustrative.

*Example 1*

A web of crimped nylon fibres weighing 3.0 ozs. per square yard and made by means of an air tunnel so that the fibres had a substantially random orientation was bonded with a co-polymer of butadiene and acrylonitrile as sold under the trade name of Hycar. The weight of the bonded web was 3.5 ozs. per square yard. The bonded web was then saturated with a paste containing 50% by weight of polymerised vinyl chloride and 45% by weight of dioctyl phthalate as a plasticiser. The paste also contained stabilisers. The web was saturated by passing it through a bath and squeezing it between the bowls of a mangle adjusted so as to reduce the excess of paste on the bonded web and to give a total weight of bonded web of 13.4 ozs. per square yard. This web was then passed through a radiant heat oven to gel the polyvinyl chloride. The temperature of the oven was 175° C. and the time of heating of the web was three minutes. The void volume of the heated web was 66% of the web.

The web was then compressed in a flat bed press, one pressure plate being heated to a temperature of 180° C. and the other to approximately 80° C. The pressure in the press was 400 lbs. per square inch and the time the web was under pressure was 15 seconds. The web was then removed and allowed to cool.

The finished material was smooth and highly compressed on the side which had been in contact with the hot plate. On the other side the material was soft and fibrous. The void volume of the finished material was 25%.

Example 2

A bonded web as in Example 1 was saturated with paste and passed through a mangle as in Example 1, but so that the total weight of the bonded web was 27 ozs. per square yard. The web was then heated in an air oven to 180° C. for 5 minutes to gel the polyvinyl chloride and then cooled in the air.

The web was then pressed as in Example 1, one plate of the press being heated to 180° C. and the pressure between the plates being 20 lbs. per square inch. The time of pressing was 300 seconds.

The void volume of the material before pressing was 35% and in the finished material 25%.

The finished material had properties similar to those of the finished material of Example 1.

Example 3

A non-woven web weighing 6 ozs. per square yard and composed of 20% cotton fibres and 80% crimped nylon fibres bonded together with butadiene/acrylonitrile latex.

The bonded web was then saturated with a paste and mangled as in Example 1. It was then heated at 175° C. for 2 minutes, 50 seconds in a hot air oven and then cooled. The weight of the material was 29 ozs. per square yard.

This material was passed over a series of high speed rollers covered with medium grade emery cloth so as to raise a short pile on one side only of the material.

The finished material had properties similar to those of the finished material of Example 1.

Example 4

A non-woven fabric weighing 3.75 ozs. per square yard and made up from a random lay of crimped nylon fibres, 3.25 ozs. per square yard, bonded together with a polyacrylic binder was saturated to a total weight of 20 ozs. per square yard with the following paste:

| | Parts |
|---|---|
| Polyvinyl chloride polymer | 60 |
| Dioctyl phthalate | 60 |
| Dispersing and wetting agent | 2.5 |
| Leather dust | 2 |

The dispersing and wetting agent was a polyethylene oxide condensate of a fatty alcohol sold under the trade name Cirrasol SF200.

The saturation was carried out on a two bowl coating machine in such a way that the filled polyvinyl chloride paste was applied through one face only of the fabric with the result that the majority of the leather dust was filtered out on to this face of the fabric.

After impregnation the filled fabric was subjected in an air oven to a temperature of 170° C. for two minutes in order to partly gel the polyvinyl chloride paste and was then allowed to cool.

The material was then heated on the filled face by contact for 30 seconds with a metal drum at 190° C. after which it was rolled between two cold rollers set apart by 0.020" in such a way that the heated face of the fabric was moulded on to the smooth steel roller and allowed to cool in contact with this roller for 5 seconds before being removed.

The finished material had properties similar to those of the finished material of Example 1.

Example 5

A non-woven base as used in Example 4 was saturated with the same polyvinyl chloride mix but by means of spraying on to one face, so that the leather dust was filtered out on to the surface. Pressing conditions were similar to Example 4.

The finished material had properties similar to those of the finished material of Example 1.

Example 6

A non-woven base as used in Example 4 was saturated to a total weight of 22 ozs. per square yard with a polyvinyl chloride paste made up from:

| | Parts |
|---|---|
| Polyvinyl chloride polymer | 60 |
| Dioctyl phthalate | 60 |
| Dispersing and wetting agent | 2.5 |
| Cotton flock | 1 |

The dispersing and wetting agent was a polyethylene oxide condensate of a fatty alcohol sold under the trade name Cirrasol SF200.

The saturation was effected by using a two bowl roller coating machine.

After filling, the material was heated to 150° C. for 3 minutes to gel the polyvinyl chloride and then allowed to cool.

The material was then heated on the filled face by contact for 30 seconds with a metal drum at 190° C. after which it was rolled between two cold rollers set apart by 0.020" in such a way that the heated face of the fabric was moulded on to the smooth steel roller and allowed to cool in contact with this roller for 5 seconds before being removed.

The finished material had properties similar to those of the finished material of Example 1.

We claim:

1. Process of manufacturing an artificial leather-like material having a "grain" side and a "flesh" side and which has substantially no tendency to crack on the "grain" side and which is porous to air and water vapour, which comprises treating a non-woven web of fibres of which at least 10% are synthetic polymeric fibres having a high degree of elasticity and recovery from creasing with a non-aqueous dispersion of a thermoplastic polymeric fibre-bonding agent containing a plasticiser for the bonding agent, the finished leather-like material containing not more than 25% and not less than 10% by weight of the fibres of the non-woven web calculated on the weight of the finished product, heating to gel at least partly the dispersion, producing a temperature differential between the two sides of the web such that one side of the web is at a temperature at which the bonding agent softens but at which the fibres of the web are not damaged while the remaining side of the web is below the temperature at which the binder softens, and, while said temperature differential obtains, applying pressure to the web to produce a void volume in the finished leather-like material of from 10% to 35%.

2. Process according to claim 1 wherein the heating to gel at least partly the dispersion suffices to soften the bonding agent and wherein one side of the web is cooled and the web then pressed between two cooled surfaces.

3. Process according to claim 1 wherein the web, after heating to gel at least partly the dispersion, is cooled and then re-heated on one side only, the re-heated side being brought into contact with a suitable paper and the two layers fused together by calendering and after calendering the paper is stripped away from the web.

4. Process according to claim 1 wherein a thin layer of a finely divided fibrous filler material is deposited on that side of the web which is to be heated.

5. Process according to claim 1 wherein the finished product has a weight of between 10 and 30 ozs. per square yard.

6. Process according to claim 1 wherein the polymeric fibres are selected from the group consisting of polyester and nylon fibres.

7. Process according to claim 1 wherein the web is composed of fibres having a substantially random orientation.

8. Process according to claim 1 wherein the bonding agent is a vinyl polymer.

9. Process according to claim 8 wherein the bonding agent is a member selected from the group consisting of polyvinyl chloride and co-polymers of vinyl chloride with vinyl acetate.

10. Process according to claim 1 wherein the bonding agent is applied as a dispersion, the liquid phase of which consists entirely of plasticiser for the bonding agent.

11. Process according to claim 1 wherein the bonding agent is applied is a dispersion, the liquid phase of which consists of a non-aqueous volatile liquid together with a plasticiser for the bonding agent.

12. A process according to claim 1 wherein, prior to applying the pressure, the web is heated on one side only so as to soften the bonding agent and wherein the pressure is applied by means of cool surfaces while the bonding agent is still soft.

References Cited in the file of this patent

UNITED STATES PATENTS

| | | |
|---|---|---|
| 2,270,829 | Powers | Feb. 3, 1942 |
| 2,689,199 | Pesce | Sept. 14, 1954 |
| 2,802,767 | Mighton | Aug. 13, 1957 |
| 2,836,576 | Piccard et al. | May 27, 1958 |
| 2,842,473 | Oberly et al. | July 8, 1958 |
| 2,894,855 | Wilhelm et al. | July 14, 1959 |
| 2,949,394 | Rodman | Aug. 16, 1960 |